Patented Apr. 20, 1937

2,077,400

UNITED STATES PATENT OFFICE 2,077,400

MOISTUREPROOF MATERIALS AND METHOD OF MAKING SAME

John H. Collins, Buffalo, N. Y., assignor, by mesne assignments, to E. I. du Pont de Nemours & Company, Wilmington, Del., a corporation of Delaware No Drawing. Application January 12, 1932, Serial No. 586,249

36 Claims. (Cl. 91—68)

This invention relates to moistureproofing compositions, moistureproof materials, and to the method of making the same.

Recently, there has been invented and marketed a transparent, moistureproof material which, in its most common species, comprises a sheet or film of regenerated cellulose coated with a composition including a cellulose derivative and a wax, and preferably also containing a resin and optionally a plasticizer. This material, by virtue of its characteristics and especially its moistureproofness, has acquired extensive and widespread use as a wrapping tissue for substances which are normally susceptible to gain or loss in moisture when it is desired to maintain said substances in their original fresh state and prevent any change in moisture content. Because of its transparency, the wrapper discloses and exhibits the contents of the package.

I have now found that I can secure comparable results by coating bases, such as those formed of paper or a cellulosic material which is preferably non-porous, non-fibrous and usually transparent, with a composition, such as a solution comprising a film-forming substance, such as natural or synthetic rubber or related substances, for example rubber, caoutchouc, gutta percha, balata, polymers of isoprene, butadiene, and their homologues, a moistureproofing wax and with or without a hardening agent, such as a hard wax, resin or the like in a volatile solvent, and subjecting the coated material to a temperature at least equal to the melting point of the wax in the composition.

It is, therefore, an object of this invention to provide a moistureproof material comprising a base formed of a cellulosic material, such as a non-fibrous, non-porous and preferably transparent material, such as sheets or films of regenerated cellulose, sheets or films of cellulose derivatives, materials coated with varnishes, esters or other non-moistureproof coatings, or sheets or films of albuminous material, such as gelatin, agar-agar, etc., coated with a composition comprising rubber or an allied substance and a moistureproofing wax with or without a hardening agent.

Another object of this invention is to provide a method of preparing moistureproof materials of the type set forth in the preceding paragraph.

Another object of this invention is to provide a moistureproofing composition.

Other objects will become apparent from the following description and appended claims.

In accordance with the principles of this invention, the selected base is coated with a composition, such as a solution comprising rubber or an allied substance and a moistureproofing wax and preferably also a hardening agent and, after the removal of the excess composition and solvent, is subjected to a temperature equal to the melting or crystallization point of the wax in the composition, either preferably simultaneously with or alternately subsequent to the drying of the coating. When the base material is of the type which loses more or less of its moisture or is dehydrated during some stage of the process and consequently becomes more or less brittle, the invention further contemplates submitting the dried coated material to a humidifying treatment, preferably carried out at an elevated temperature sufficiently high so that the coating will lose a portion of its impermeability, thereby allowing moisture from the circumambient atmosphere to diffuse through it into the inner base which is thus softened.

The application of the coating composition may be accomplished in any suitable manner, such as by passing the base through a bath containing the same, by spraying the coating composition thereon, or the like. After the application of the composition, the excess thereof may be removed in any convenient manner. When the base has beads on its longitudinal edges, the excess coating composition may be removed by utilizing the apparatus described in Patent No. 1,826,697.

The coated film is then introduced into an appropriate drier, such as a chamber, through which air is circulated where it is dried by the evaporation of the solvent, after a rapid rise of temperature, at a temperature at least approximately equal to the melting point or crystallization point of the waxes in the composition. Alternately, the coated base may be first dried at some lower temperature and then subjected to a heat treat-treatment at a temperature at least equal to the melting point or crystallization point of the wax in the composition.

In the preferred form of the invention, sheets or films of regenerated cellulose are contemplated as the base. However, paper and other cellulosic materials, especially those which are non-fibrous, non-porous and preferably transparent, such as treated paper, sheets or films of cellulose derivatives, materials coated with non-moistureproofing compositions, sheets or films of albuminous materials, such as gelatin, agar-agar, etc., are also contemplated.

In its simplest form, the moistureproofing composition contemplates a solution of rubber or allied substances and waxes in a common solvent. The coatings resulting from such a composition are usually more or less subject to marking when handled, particularly where the moistureproofing wax is soft wax, such as paraffin or the softer varieties of ceresin wax. This may not be objectionable for certain uses but for a large number of purposes it is objectionable. Thus, the invention also contemplates overcoming this undesirable property and this is secured by introducing a substance which increases the hardness of the coating and more fully described hereafter, in the composition.

As the rubber constituent, pure gum or unvulcanized rubber, such as crepe rubber, is preferred. However, rubber derivatives, such as chlorinated rubber, as well as caoutchouc, gutta percha, and synthetic rubbers, such as the polymers of isoprene, butadiene and their homologues, may be used. The aforementioned rubber and allied materials may be also used singly or in combination with one another.

As the moistureproofing ingredient, any wax or wax-like substance capable of moistureproofing may be used. The paraffins, and preferably the high melting paraffins, such as those melting over 50° C., or better 55° C., or still better approximately 60° C. or over, are preferred. Wax derivatives and other waxes or waxy materials, such as ceresin, Montan, palm wax, Japan wax, Chinese insect wax, spermaceti, tallow, beeswax or synthetic waxes, may be used. It is to be understood that the waxes or waxy substances may be used singly or combined, as desired.

As the solvent, an organic liquid is used in which both the wax and the rubber or allied substance is soluble. As illustrative examples may be mentioned toluene, benzene, xylene, tetrachlorethane, or the like. It is advantageous to choose the solvent with reference to the wax used, particularly in regard to the boiling point of said solvent which should preferably be higher than the melting point of the wax. For example, when a wax having a melting point of 60° C. is used, a solvent, such as toluene of a boiling point of 111° C., will give good results. Frequently, when the temperature of the coating is to be maintained at or above the melting point of the wax in the composition while the solvent is being evaporated, it is preferable to use a mixed solvent in which at least one of the components has a boiling point higher than the melting point of the wax. The term "solvent", therefore, as employed in this specification is intended to cover one or more solvents with or without diluents. In all cases, the solvent selected is of such a nature that it will not injure the base being coated.

As the substance which increases the hardness of the coating, a hard wax, such as carnauba wax, candelilla wax, etc., or a hard or soft resin or gum, either natural or synthetic, and including for example, gum dammar, gum mastic, zinc resinate, glyptal resins, and coumarin resins, may be used. The hardening agents, of course, may be used either singly or in combination, as desired. The resins are preferably soluble in hydrocarbons, such as benzene, xylene, toluene, gasoline, etc., but it is, of course, obvious that other resins may be used which are soluble in other liquids dissolving the rubber or waxes in question. Compositions wherein gums or resins are utilized deposit coatings which possess superior surface gloss and smooth characteristics.

The compositions may, of course, be modified in many ways without departing from the spirit of the invention. Pigments or pigment-like materials may be added to obtain various effects. Oil-soluble dyes may be added where a transparent colored coating is desired. The coating may be further modified by the addition of metallic soaps or other substances to the coating composition. Variegated effects can be secured by the use of powdered mica, fish scales, metallic salts, etc. Rubber anti-oxidants, accelerators and vulcanizing agents may also be incorporated in the composition.

The relative proportions of the solid ingredients constituting the solution or coating may vary within wide limits depending on the specific materials used and/or the properties desired in the final product. Depending on the wax or wax mixture used and the properties of the coating desired, i. e. surface, flexibility, transparency, and the like, the amount of wax may range from a relatively small quantity, such as, for example, 1% to 2%, to a relatively high quantity, such as 80% or even 95%, based on the total solids. When gums or resins are employed in conjunction with the other component, there is also a wide range of compositions which will give satisfactory results. Where a hard resin is used, the rubber or allied substance acts as a softening agent, preventing cracking of the coating when the sheets are creased or folded. In any formulation it is possible to use larger quantities of a soft gum, without introducing brittleness, as compared to the quantity of hard gum.

When compositions of the type previously described are applied in thin layers to bases also of the type previously described, there results a product which is highly moistureproof and flexible. When the coating is a few ten thousandths of an inch in thickness more or less, it still gives the desired moistureproof effects and is transparent. Thus, when the base is a transparent material, such as sheets or films of regenerated cellulose, the product is also transparent. Usually rather thick coatings will not yield perfect optical transparency, but it is unnecessary to apply such quantities of materials on the base to secure an acceptable product as regards both moistureproofness and transparency. Due to the hardening agent, the material does not smear on handling and possesses the desirable slip surface. The material, when used as a wrapper, can be heat sealed. By virtue of the fact that the solid ingredients and the solvents are cheaper than those formerly used in moistureproofing compositions, the product is more economical than that which has been heretofore produced.

In order to more fully explain the nature of the invention, the following illustrative, non-restrictive and specific embodiments are set forth:

*Example I*

|  | Parts |
|---|---|
| Rubber | 5 |
| High melting paraffin | 6.25 |

Dissolve in toluene to give a 2% to 10% solution. Coat regenerated cellulose film and transfer at once to a drier at 80–90° C. and dry.

The coating is transparent but is subject to marking when handled.

*Example II*

| | Parts |
|---|---|
| Rubber | 5 |
| High melting paraffin | 5 |
| Carnauba wax | 5 |

Dissolve, coat, and dry as in Example I.

The coating is transparent, flexible, and does not smear when handled.

*Example III*

| | Parts |
|---|---|
| Rubber | 5 |
| High melting paraffin | 15 |
| Carnauba wax | 15 |

Dissolve, coat, and dry as in Example I.

The coating is transparent, flexible, and not subject to marks when handled.

*Example IV*

| | Parts |
|---|---|
| Rubber | 5 |
| Ceresin wax | 10 |

Dissolve, coat, and dry as in Example I.
The coating is transparent and flexible.

*Example V*

| | Parts |
|---|---|
| Rubber | 10 |
| Wax | 1 |

Dissolve, coat, and dry as in Example I.

The coating is transparent, flexible, and freer from waxy feel than the product of Example I.

*Example VI*

| | Parts |
|---|---|
| Rubber | 5 |
| High melting paraffin | 15 |
| Gum dammar | 10 |

Dissolve, coat, and dry as in Example I.
The coating is transparent, flexible, and does not smear on handling.

*Example VII*

| | Parts |
|---|---|
| Rubber | 5 |
| High melting paraffin | 5 |
| Vinyl chloride-vinyl acetate resin | 5 |

Dissolve, coat, and dry as in Example I.

The coating is transparent, flexible, and does not smear on handling.

*Example VIII*

| | Parts |
|---|---|
| Rubber | 5 |
| High melting paraffin | 25 |
| Sulphur | ⅛ |
| Diphenyl guanidine | .02 |
| Solvent | { toluene 400 / gasoline 200 } |

This solution is applied and treated as in Example I.

The coating is transparent and flexible.

By the term "moistureproof" employed herein is meant the ability of a film to resist the transmission or diffusion of moisture or water vapor to an extent at least 3 times as great as that displayed by films of equal thickness and produced from rubber compositions heretofore formulated without the admixture thereto of waxes or wax-like materials when tested under the same conditions, and/or when applied to bases yield a product which is at least 7 times as effective in resisting the transmission or diffusion of moisture therethrough as the uncoated sheets when tested under the same conditions. It is to be understood that the above definition merely sets forth the minimum improvements in moistureproofing effects which may be secured by the invention and that the compositions herein disclosed are inherently capable of many formulations according to the disclosures herein set forth, and produce films showing an improvement over the prior art coatings of not only 3, but 10, 20, 40 and in some cases 100 fold. When applied to a base, a coated material is obtained which will readily show not only 7, but as much as 25, 50, or even 100 or more times the resistance to the passage of moisture vapor therethrough as will an uncoated sheet when tested under the same conditions. It is therefore apparent that the figures set forth in the above definition are in nowise limiting with respect to the higher degrees of moistureproofing that can be obtained.

Since it is obvious that various changes and modifications may be made in the above description without departing from the nature or spirit thereof, this invention is not restricted thereto except as set forth in the appended claims.

I claim:

1. An article of manufacture comprising a base formed of a sheet of a non-fibrous and transparent material coated with a composition comprising a film-forming substance and a moistureproofing wax in proportions and of a thickness to produce a transparent moistureproof product, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

2. An article of manufacture comprising a base formed of a sheet of a non-fibrous and transparent material coated with a composition comprising a film-forming substance, a moistureproofing wax and a substance which increases the hardness of the coating in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

3. An article of manufacture comprising a base formed of a sheet of a non-fibrous and transparent material coated with a composition comprising a film-forming substance, a moistureproofing wax and a hard wax in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

4. An article of manufacture comprising a base formed of a sheet of a non-fibrous and transparent material coated with a composition comprising a film-forming substance, a moistureproofing wax and a gum in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

5. An article of manufacture comprising a base formed of a sheet of a non-fibrous and transparent material coated with a composition comprising a film-forming substance and a paraffin having a high melting point in proportions and of a thickness to produce a transparent moistureproof product, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

6. An article of manufacture comprising a base formed of a sheet of a non-fibrous and transparent material coated with a composition comprising a film-forming substance, a paraffin having a high melting point and a substance which increases the hardness of the coating in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

7. An article of manufacture comprising a base formed of a sheet of a non-fibrous and transparent material coated with a composition comprising a film-forming substance, a paraffin having a high melting point and a hard wax in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

8. An article of manufacture comprising a base formed of a sheet of a non-fibrous and transparent material coated with a composition comprising a film-forming substance, a paraffin having a high melting point and a gum in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

9. An article of manufacture comprising a base formed of a sheet of a non-fibrous and transparent cellulosic material coated with a composition comprising a film-forming substance and a moistureproofing wax in proportions and of a thickness to produce a transparent moistureproof product, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

10. An article of manufacture comprising a base formed of a sheet of a non-fibrous and transparent cellulosic material coated with a composition comprising a film-forming substance, a moistureproofing wax and a substance which increases the hardness of the coating in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

11. An article of manufacture comprising a base formed of a sheet of a non-fibrous and transparent cellulosic material coated with a composition comprising a film-forming substance, a moistureproofing wax and a hard wax in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

12. An article of manufacture comprising a base formed of a sheet of a non-fibrous and transparent cellulosic material coated with a composition comprising a film-forming substance, a moistureproofing wax and a gum in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

13. An article of manufacture comprising a base formed of a sheet of a non-fibrous and transparent cellulosic material coated with a composition comprising a film-forming substance and a paraffin having a high melting point in proportions and of a thickness to produce a transparent moistureproof product, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

14. An article of manufacture comprising a base formed of a sheet of a non-fibrous and transparent cellulosic material coated with a composition comprising a film-forming substance, a paraffin having a high melting point and a substance which increases the hardness of the coating in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

15. An article of manufacture comprising a base formed of a sheet of a non-fibrous and transparent cellulosic material coated with a composition comprising a film-forming substance, a paraffin having a high melting point and a hard wax in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

16. An article of manufacture comprising a base formed of a sheet of a non-fibrous and transparent cellulosic material coated with a composition comprising a film-forming substance, a paraffin having a high melting point and a gum in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

17. An article of manufacture comprising a base formed of a sheet of regenerated cellulose coated with a composition comprising a film-forming substance and a moistureproofing wax in proportions and of a thickness to produce a transparent moistureproof product, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

18. An article of manufacture comprising a base formed of a sheet of regenerated cellulose coated with a composition comprising a film-forming substance, a moistureproofing wax and a substance which increases the hardness of the coating in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

19. An article of manufacture comprising a base formed of a sheet of regenerated cellulose coated with a composition comprising a film-forming substance, a moistureproofing wax and a hard wax in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

20. An article of manufacture comprising a base formed of a sheet of regenerated cellulose coated with a composition comprising a film-forming substance, a moistureproofing wax and a gum in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

21. An article of manufacture comprising a base formed of a sheet of regenerated cellulose coated with a composition comprising a film-forming substance and a paraffin having a high melting point in proportions and of a thickness to produce a transparent moistureproof product, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

22. An article of manufacture comprising a base formed of a sheet of regenerated cellulose coated with a composition comprising a film-forming substance, a paraffin having a high melting point and a substance which increases the hardness of the coating in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

23. An article of manufacture comprising a base formed of a sheet of regenerated cellulose coated with a composition comprising a film-forming substance, a paraffin having a high melting point and a hard wax in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

24. An article of manufacture comprising a base formed of a sheet of regenerated cellulose coated with a composition comprising a film-forming substance, a paraffin having a high melting point and a gum in proportions and of a thickness to produce a transparent moistureproof product which is non-tacky, does not appreciably smear on handling and possesses a good surface slip, said film-forming substance being selected from the group which consists of natural rubber, including gutta percha, balata and caoutchouc; synthetic rubbers, including polymers of isoprene, butadiene and their homologues; and rubber derivatives, including chlorinated rubber.

25. A method of preparing transparent moistureproof materials which comprises coating a base formed of a sheet of a non-fibrous and transparent material with a composition comprising a film-forming substance and a moistureproofing wax dissolved in a solvent, said film-forming substance being selected from the group which consists of natural rubber, including gutta percha, balata and caoutchouc; synthetic rubbers, including polymers of isoprene, butadiene and their homologues; and rubber derivatives, including chlorinated rubber; the proportions of the ingredients and the thickness of the coating being selected to produce a transparent moistureproof material, and evaporating the solvent at a temperature at least equal to the melting point of the wax in the composition.

26. A method of preparing transparent moistureproof materials which comprises coating a base formed of a sheet of a non-fibrous and transparent material with a composition comprising a film-forming substance, a moistureproofing wax and an agent which increases the hardness of the final coating dissolved in a solvent, said film-forming substance being selected from the group which consists of natural rubber, including gutta percha, balata and caoutchouc; synthetic rubbers, including polymers of isoprene, butadiene and their homologues; and rubber derivatives, including chlorinated rubber; the proportions of the ingredients and the thickness of the coating being selected to produce a transparent moistureproof material which is non-tacky, does not appreciably smear on handling and possesses a good surface slip, and evaporating the solvent at a temperature at least equal to the melting point of the wax in the composition.

27. A method of preparing transparent moistureproof materials which comprises coating a base formed of a sheet of a non-fibrous and transparent cellulosic material with a composition comprising a film-forming substance and a moistureproofing wax dissolved in a solvent, said film-forming substance being selected from the group which consists of natural rubber, including gutta percha, balata and caoutchouc; synthetic rubbers, including polymers of isoprene, butadiene and their homologues; and rubber derivatives, including chlorinated rubber; the proportions of the ingredients and the thickness of the coating being selected to produce a transparent moistureproof material, and evaporating the solvent at a temperature at least equal to the melting point of the wax in the composition.

28. A method of preparing transparent moistureproof materials which comprises coating a base formed of a sheet of a non-fibrous and transparent cellulosic material with a composition comprising a film-forming substance, a moistureproofing wax and an agent which increases the hardness of the final coating dissolved in a solvent, said film-forming substance being selected from the group which consists of natural rubber, including gutta percha, balata and caoutchouc; synthetic rubbers, including polymers of isoprene, butadiene and their homologues; and rubber derivatives, including chlorinated rubber; the proportions of the ingredients and the thickness of the coating being selected to produce a transparent moistureproof material which is non-tacky, does not appreciably smear on handling and possesses a good surface slip, and evaporating the solvent at a temperature at least equal to the melting point of the wax in the composition.

29. A method of preparing transparent moistureproof materials which comprises coating a base formed of a sheet of regenerated cellulose with a composition comprising a film-forming substance and a moistureproofing wax dissolved in a solvent, said film-forming substance being selected from the group which consists of natural rubber, including gutta percha, balata and caoutchouc; synthetic rubbers, including polymers of isoprene, butadiene and their homologues; and rubber derivatives, including chlorinated rubber; the proportions of the ingredients and the thickness of the coating being selected to produce a transparent moistureproof material, and evaporating the solvent at a temperature at least equal to the melting point of the wax in the composition.

30. A method of preparing transparent moistureproof materials which comprises coating a base formed of a sheet of regenerated cellulose with a composition comprising a film-forming substance, a moistureproofing wax and an agent which increases the hardness of the final coating dissolved in a solvent, said film-forming substance being selected from the group which consists of natural rubber, including gutta percha, balata and caoutchouc; synthetic rubbers, including polymers of isoprene, butadiene and their homologues; and rubber derivatives, including chlorinated rubber; the proportions of the ingredients and the thickness of the coating being selected to produce a transparent moistureproof material which is non-tacky, does not appreciably smear on handling and possesses a good surface slip, and evaporating the solvent at a temperature at least equal to the melting point of the wax in the composition.

31. An article of manufacture comprising a base formed of a sheet of non-fibrous and transparent material coated with a composition comprising a film-forming substance and a moistureproofing wax in proportions and of a thickness to produce a transparent moistureproof product, said film-forming substance being chlorinated rubber.

32. An article of manufacture comprising a sheet of non-fibrous and transparent cellulosic material coated with a composition comprising a film-forming substance and a moistureproofing wax in proportions and of a thickness to produce a transparent moistureproof product, said film-forming substance being chlorinated rubber.

33. An article of manufacture comprising a base formed of a sheet of regenerated cellulose coated with a composition comprising a film-forming substance and a moistureproofing wax in proportions and of a thickness to produce a transparent moistureproof product, said film-forming substance being chlorinated rubber.

34. A sheet of cellulosic material coated with a thin film composed of a composition including chlorinated rubber and a wax, the wax being in amount such that the said film will be substantially transparent.

35. A sheet of transparent cellulosic material coated with a thin film composed of a composition including chlorinated rubber and a wax, the wax being in amount such that the said film will be substantially transparent.

36. An article of manufacture comprising a sheet of transparent, fibrous cellulosic material coated with a composition comprising a film-forming substance and a moistureproofing wax in proportions and of a thickness to produce a transparent moistureproof product, said film-forming substance being chlorinated rubber.

JOHN H. COLLINS.